United States Patent

Lee

[15] 3,653,965

[45] Apr. 4, 1972

[54] RECHARGEABLE GALVANIC CELL AND ELECTROLYTE THEREFOR-1

[72] Inventor: Tien Shuey Lee, Rocky River, Ohio

[73] Assignee: Union Carbide Corporation, New York, N.Y.

[22] Filed: Oct. 16, 1970

[21] Appl. No.: 81,521

[52] U.S. Cl..................................136/30, 136/154
[51] Int. Cl....................................H01m 41/00, H01m 43/02
[58] Field of Search..................136/30, 154, 6, 102, 31; 204/55

[56] References Cited

UNITED STATES PATENTS

| | | | |
|---|---|---|---|
| 2,714,624 | 8/1955 | Costa | 136/28 |
| 2,994,625 | 8/1961 | Mendelsohn et al. | 136/154 |
| 3,023,262 | 2/1962 | Emmerling et al. | 136/120 |
| 3,057,944 | 10/1962 | Ruetschi et al. | 136/20 |
| 3,258,362 | 6/1966 | Rampel | 136/75 |
| 3,379,635 | 4/1968 | Doehren et al. | 204/284 |

OTHER PUBLICATIONS

Paul Bauer, " Batteries For Space Power Systems," NASA SP- 172, 1968, p. 156.

*Primary Examiner*—Anthony Skapars
*Attorney*—Charles J. Metz, John F. Hohmann and John R. Doherty

[57] ABSTRACT

A rechargeable galvanic cell having a zinc anode and a zinc-containing electrolyte which comprises an aqueous alkaline or aqueous acidic medium containing dissolved zinc ions and ethylene oxide polymers or their derivatives for suppressing zinc dendrite formation during the charging cycle.

6 Claims, No Drawings

RECHARGEABLE GALVANIC CELL AND ELECTROLYTE THEREFOR-1

This invention relates to rechargeable galvanic cells having improved zinc-containing electrolytes which contain ethylene oxide polymers, or their derivatives, or a mixture thereof for suppressing formation of zinc dendrites during the charging cycle.

When zinc is electrolytically plated out of an alkaline zincate solution at relatively high current densities and relatively low zincate ion concentrations, there is a tendency to deposit the zinc in the form of long dendritic crystals. This tendency is a considerable draw-back to the use of zinc electrodes in rechargeable alkaline cells, because as a cell of this type is charged, the dendritic crystals grow out and away from zinc electrodes which serve as a substrate. Ultimately, these crystals penetrate the separators interposed between the electrodes and internally short circuit the cell. The cycle life of the rechargeable cell is thus materially reduced.

Efforts to alleviate the situation existing with rechargeable alkaline cells heretofore have centered primarily on the development of new separator materials and on the use of thicker or multi-layer separators. Unfortunately, this approach limits the oxygen gas transfer within the cell for the purposes of recombination during an overcharge of the cell containing the zinc electrode. This condition is particularly troublesome in conjunction with sealed rechargeable cells since high gas pressures can develop within the cells.

An alternate approach to the elimination of zinc dendrites that has been explored is the reported suppression of zincate ions in the alkaline electrolytes commonly employed. This approach is illustrated by the silver oxide-zinc cells of Mendelsohn et al., U.S. Pat. No. 2,994,625. In this patent, the presence of zincate in the electrolyte is eliminated by substantially saturating the electrolyte with ions of certain amphoteric metals, particularly with aluminates.

A somewhat similar problem with dendrite formation is encountered on charging a zinc electrode in aqueous acid solutions, although the current densities at which dendrite formation begins are generally somewhat higher than in alkaline solutions. For example, dendrites will tend to form on charging of a zinc electrode at current densities higher than about 30–40 mA/cm.$^2$ in aqueous $ZnCl_2$ electrolyte (3 M). Even at lower charging current densities in these acidic electrolytes, the zinc deposit is not always desirably level and uniform.

The present invention is based upon the discovery that the provision in a zinc-containing aqueous electrolyte of ethylene oxide polymers or their derivatives serves to suppress the formation of zinc dendrites in rechargeable galvanic cells and produce level, uniform and adherent zinc deposits on charging.

It is a principal object of the invention to provide a zinc-containing electrolyte from which a substantially level and adherent zinc deposit can be electroplated.

It is another object of the invention to provide a zinc-containing electrolyte which decreases the tendency of a rechargeable galvanic cell employing a zinc electrode to form dendrites on the zinc electrode during charging.

It is another object of the invention to provide means for extending the cycle life of a rechargeable zinc cell.

A further object of the invention is to provide an alkaline zincate or acidic zinc electrolyte containing ethylene oxide polymers or their derivatives.

Other objects of the invention will be apparent from a reading of the accompanying description of the invention.

The foregoing objects of the invention are achieved by an electrolyte which is an aqueous acidic or alkaline medium containing zinc or zincate ions and an ethylene oxide polymer or its derivatives.

The aqueous alkaline media that are employed in the electrolytes of the invention are aqueous solutions of alkali metal hydroxides, for instance, sodium hydroxide, potassium hydroxide, lithium hydroxide, and the like. The choice of the particular hydroxide is not narrowly critical and will depend upon factors such as the type of service intended for the galvanic cell, the desired conductivity of the electrolyte, and economics of the intended application. Such factors are well known to those having ordinary skill in the art. For high rate cells having universal application, potassium hydroxide is preferred. As is well known in the art, the concentration of alkali metal hydroxide in the aqueous alkaline electrolyte can vary from about 1 to 16 molar, and preferably from about 6 to about 12 molar.

The aqueous acidic media that are employed in the electrolytes of the invention are aqueous solutions of either zinc salts, e.g., zinc chloride, zinc sulfate, etc., or zinc salts plus ammonium salts, such as ammonium chloride, ammonium sulfate, etc. The choice of the particular zinc salt is not narrowly critical, and will depend upon factors such as the type of service for which the galvanic cell is intended, the desired conductivity of the electrolyte and other electrochemical properties. Such factors are well known to those having ordinary skill in the art. For ordinary applications, the combination of zinc chloride and ammonium chloride is preferred. The concentration of the zinc salts in the aqueous acidic electrolyte can vary from about 1 to 6 molar and preferably from about 2 to 4 molar.

Zinc can be introduced into the electrolyte in the desired amounts by way of any zinc-bearing compounds which are soluble in the electrolyte. For instance, compounds such as zinc oxide, potassium zincate, sodium zincate, zinc chloride, zinc sulfate, and the like can be used. Zinc oxide is the preferred compound for this purpose in alkaline medium because of its adequate solubility and also because no extraneous metal ions are introduced into the electrolyte upon dissolution. Zincate ions are formed in the alkaline solution as the zinc-bearing compound dissolves therein. Zinc can also be introduced into the electrolyte by anodic dissolution of zinc from an anode material of the cell.

The materials that are employed in the cell electrolyte to suppress zinc dendrite formation are the ethylene oxide polymers and their derivatives. Such polymers are known in the art and those that are contemplated for use in this invention are di- and triethylene glycol, the polyethylene glycols having an average molecular weight range of about 200 to about 6,000, and their mono- and diethers and esters. Polyethylene glycols of average molecular weight 200 – 350 are the preferred additives. The ether and ester groups are preferably of low molecular weight, such as $C_4$ and lower alkyl ethers and $C_4$ and lower alkanoate esters. Suitable ether derivatives include, for example, methoxy diethylene glycol and the methoxy or ethoxy polyethylene glycols. Suitable ester derivatives include polyethylene glycol acetate.

These additives may be used singly or in combination with each other. The higher molecular weight polyethylene glycols (e.g., 4,000 – 6,000) have a lower solubility in alkaline media and may have to be used in combination with a lower molecular weight material in order to obtain an effective amount of additive in solution in the electrolyte. The di- and triethylene glycol additives are preferably used in combination with at least one of the polyethylene glycols or their derivatives.

These materials are employed in the electrolyte in an amount sufficient to suppress the formation of zinc dendrites on charging. For instance, a concentration of from about 0.01 to about 10 weight percent, and preferably from about 0.05 to about 1 weight percent (based on the weight of the electrolyte) has been found to be useful for this purpose.

The additive can simply be dissolved in the electrolyte, or it can be incorporated in the electrolyte by coating the additive on an electrode, e.g., the anode, and permitting the additive to dissolve in the electrolyte over a period of time. In the case of low solubility of the additive in the electrolyte, it can be used in the form of an emulsion with the electrolyte. Alternatively, the additive can be incorporated in a particulate zinc anode by mixing it with the powdered zinc during fabrication of the electrode.

In the rechargeable galvanic cells contemplated by the invention, zinc is employed as the anode. The anode can be massive zinc, or it can be zinc plated on another metal, or it can be powdered zinc mixed with zinc oxide compressed on a suitable metal grid or screen. The active cathode material can be either a gas, such as air or oxygen, or a solid material such as nickel oxide, silver oxide, lead dioxide, mercuric oxide, or manganese dioxide, etc.

The following example illustrates the practice of the invention.

EXAMPLE 1

In alkaline media:

A galvanic cell was constructed employing an epoxy-lined 30-ml. beaker as the container. The electrolyte employed was 9N aqueous potassium hydroxide containing 5 weight percent zinc oxide and was made from reagent grade chemicals and distilled water. Both the anode and the cathode of the cell were made from pure zinc disks. Only one side of each disk, which side had an active face area of about 2 square centimeters, was exposed to the electrolyte. The remaining electrode surfaces were electrically insulated with epoxy. The exposed surfaces of the electrodes were prepared by first abrading them with abrasive paper down through 00 grade and then etching them in an 18 weight percent hydrochloric acid solution containing about 1 – 3 weight percent nitric acid. Finally, the electrodes were rinsed thoroughly in distilled water and placed in the cell. The test cell was charged and discharged using direct current from an external power supply in series with a variable resistor. The charging current was varied from a few milliamperes to about 30 milliamperes per square centimeter of electrode surface. During charging, metallic zinc was deposited onto that zinc electrode which was intended to be the anode in a rechargeable cell system. The deposit was non-adherent and ranged in form from mossy zinc to crystalline zinc dendrites in the charging current density range employed. As CARBOWAX 200

[1]Polyethylene glycol having a molecular weight of about 190 – 210, was added to the electrolyte in a final concentration of about 0.05 to 0.1 weight percent, the deposit obtained at the zinc electrode during charging became adherent and smooth. After more than 10 continuous charge-discharge cycles the final deposit obtained after the last charging cycle was still smooth and adherent. It is expected that even after several hundred continuous charge-discharge cycles, the final deposit would still be smooth and adherent. Based upon this fact, the additives of this invention would be very beneficial in a rechargeable alkaline cell employing a zinc anode.

Another good feature of this invention is that the effectiveness of the additive was not destroyed by electrolysis at both electrodes during charge-discharge cycling. The following experiment illustrates this point: A pair of pure nickel electrodes were placed in a cell containing only 9N aqueous potassium hydroxide solution and 0.05 weight percent CARBOWAX 200 dissolved therein. Continuous electrolysis was carried out for 76 hours by supplying to the pair of nickel electrodes a direct current of 30 milliamperes per square centimeter. The nickel electrodes were then removed and 5 weight percent zinc oxide was dissolved in the electrolyzed solution. Finally, zinc electrodes were placed in the electrolyzed solution, and charging and discharging from an outside DC source was begun. The deposit obtained during the charging cycle was still smooth and adherent at a current density ranging from a few to about 30 milliamperes per square centimeter as indicated in the preceding paragraph.

Other examples of additives in aqueous alkaline media which produced smooth zinc deposits during the charging cycle are the following:

1. electrolyte:
9N KOH, 5 w/o ZnO
additive:
CARBOWAX 350 0.1 w/o (this is a methoxy polyethylene glycol of mol. wt. 335–365).
charging current density:
20 mA/cm.$^2$ 2. electrolyte:
9N KOH, 5 w/o ZnO
additive:
CARBOWAX 4000 (0.2 percent as emulsion) (mol. wt. = 3,000–3,700200 (0.05 w/o) (mol. wt. = 190–210)
charging current density:
25 mA/cm$^2$ 3 electrolyte:
9 N KOH, 5 w/o ZnO
additives:
methoxy diethylene glycol (0.07 w/o), CARBOWAX 350 (0.1 w/o).
charging current density:
10 mA/cm$^2$ 4 electrolyte:
12 N KOH, 6 w/o ZnO
additives:
methoxy diethylene glycol (0.1 w/o), CARBOWAX 300 (0.1 w/o) (mol. wt. = 285–315)
charging current density:
20 mA/cm.$^2$ 5. electrolyte:
6 N KOH, 3.5 w/o ZnO
additives:
CARBOWAX 300 (0.12 w/o), triethylene glycol (0.12 w/o)
charging current density:
15 mA/cm.$^2$ 6. electrolyte:
9 N KOH, 5 w/o ZnO
additives:
ethoxy diethylene glycol, 0.35 w/o
charging current density:
30 mA/cm.$^2$ 7. electrolyte:
9 N KOH, 5 w/o ZnO
additives:
ethoxy triethylene glycol 0.25 w/o
charging current density:
25 mA/cm.$^2$ 8. electrolyte:
9 N KOH, 5 w/o ZnO
additives:
methoxy triethylene glycol 0.45 w/o
charging current density:
20 mA/cm.$^2$ 9. electrolyte:
9 N KOH, 5 w/o ZnO
additives:
ethoxy diethylene glycol acetate 0.3 w/o
charging current density:
25 mA/cm.$^2$

EXAMPLE 2

The following are examples of additives in acidic electrolytes: For the tests in acidic media, the test cell was assembled using an unlined PYREX beaker as the container. The procedure of treating the electrodes was the same as that used for alkaline media. The electrolyte was a 3 molar aqueous zinc chloride solution made from analytical reagent grade chemicals and distilled water. Greater current densities could be used during the charging cycle than were used in alkaline media. Without the additives of this invention, the deposit obtained during the charge cycle was uneven and dendritic. In the presence of the additives, the deposit obtained during the charging cycle was smooth and nondendritic. The following are specific examples of conditions under which the deposits obtained during the charging cycle were smooth and nondendritic:

1. electrolyte:
   $ZnCl_2$ (3 M)
   additives:
   CARBOWAX 600 (0.12 w/o) (mol. wt. = 570-630) CARBOWAX 4000 (0.1 w/o)
   charging:
   current density:
   35 mA/cm.$^2$
2. electrolyte:
   $ZnCl_2$ (3 M)
   additives:
   CARBOWAX 200 (0.25 w/o)
   charging
   current density:
   35 mA/cm.$^2$
3. electrolyte:
   $ZnCl_2$ (3 M) and $NH_4Cl$ (1 M)
   additives:
   CARBOWAX 200 (0.3 w/o), CARBOWAX 1540 (0.08 w/o) mol. wt. = 1,300–1,600)
   charging
   current density:
   80 mA/cm.$^2$
4. electrolyte:
   $ZnCl_2$ (3 M)
   additives:
   ethoxy diethylene glycol acetate (0.2 w/o)
   charging
   current density:
   40 mA/cm.$^2$

What is claimed is:

1. A rechargeable galvanic cell including zinc anode, a cathode and an electrolyte, wherein the electrolyte comprises an aqueous solution containing soluble zinc and an ethylene oxide polymer in an amount sufficient to suppress formation of dendrites on said zinc anode during charging of the cell and wherein the ethylene oxide polymer is selected from the group consisting of diethylene glycol, triethylene glycol, polyethylene glycol having a molecular weight of from about 200 to about 6,000, alkyl ethers thereof, the alkyl having from one to four carbon atoms, and alkanoate esters thereof, the alkanoate having from one to four carbon atoms.

2. The galvanic cell of claim 1 wherein the ethylene oxide polymer is present in the electrolyte in an amount of from about 0.01 to about 10 weight percent, based on weight of the electrolyte.

3. The galvanic cell of claim 1 wherein the ethylene oxide polymer is present in the electrolyte in an amount of from about 0.05 to about 1 weight percent, based on weight of the electrolyte.

4. The galvanic cell of claim 1 wherein the electrolyte is alkaline.

5. The galvanic cell of claim 1 wherein the electrolyte is acidic.

6. The galvanic cell of claim 1 wherein the ethylene oxide polymer is polyethylene glycol having a molecular weight of from about 200 to about 350, a methyl ether thereof, an ethyl ether thereof, or an acetate ester thereof.

* * * * *

UNITED STATES PATENT OFFICE

CERTIFICATE OF CORRECTION

Patent No. 3,653,965                              Dated April 4, 1972

Inventor(s) Tien Shuey Lee

It is certified that error appears in the above-identified patent and that said Letters Patent are hereby corrected as shown below:

Column 4, line 5 should read --3000-3700) and CARBOWAX 200 (0.05 w/o) (mol.--.

Signed and sealed this 26th day of September 1972.

(SEAL)
Attest:

EDWARD M. FLETCHER, JR.
Attesting Officer

ROBERT GOTTSCHALK
Commissioner of Patents